United States Patent
Cao et al.

(10) Patent No.: US 12,411,626 B2
(45) Date of Patent: *Sep. 9, 2025

(54) FILE SYSTEM AND HOST PERFORMANCE BOOSTER FOR FLASH MEMORY

(71) Applicant: YANGTZE MEMORY TECHNOLOGIES CO., LTD., Wuhan (CN)

(72) Inventors: Kaiyao Cao, Wuhan (CN); Yaping Zhang, Wuhan (CN); Xiuli Sun, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,524

(22) Filed: Oct. 10, 2023

(65) Prior Publication Data

US 2024/0036750 A1 Feb. 1, 2024

Related U.S. Application Data

(63) Continuation of application No. 17/307,083, filed on May 4, 2021, now Pat. No. 11,829,621, which is a
(Continued)

(51) Int. Cl.
*G06F 3/06* (2006.01)

(52) U.S. Cl.
CPC .......... *G06F 3/0638* (2013.01); *G06F 3/0604* (2013.01); *G06F 3/0655* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 9,747,202 B1 * 8/2017 Shaharabany ...... G06F 12/0246
10,430,117 B2 10/2019 Jean
(Continued)

FOREIGN PATENT DOCUMENTS

CN 111538682 A 8/2020
CN 111581121 A 8/2020
(Continued)

OTHER PUBLICATIONS

J. Hong, S. Han and E.-Y. Chung, "A RAM cache approach using host memory buffer of the NVMe interface," 2016 International SoC Design Conference (ISOCC), Jeju, Korea (South), 2016, pp. 109-110, doi: 10.1109/ISOCC.2016.7799757. (Year: 2016).*
(Continued)

*Primary Examiner* — Daniel C. Chappell
(74) *Attorney, Agent, or Firm* — BAYES PLLC

(57) ABSTRACT

In an aspect, a method for managing a logic to physical (L2P) mapping table of a memory device is disclosed. A first configuration corresponding to a file is received from a host device with the memory device. Transmitting an L2P dirty entry notification associated with the file to the host device is refrained from. The L2P dirty entry notification indicates that an L2P entry of an L2P mapping table stored in the host device has become dirty. In response to the refraining, a first confirmation is transmitted to the host device.

20 Claims, 7 Drawing Sheets

Related U.S. Application Data continuation of application No. PCT/CN2021/084657, filed on Mar. 31, 2021.

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | |
|---|---|---|---|
| 10,983,918 | B2 | 4/2021 | Manganelli et al. |
| 11,126,562 | B2 | 9/2021 | Lee |
| 11,169,744 | B2 | 11/2021 | Brief et al. |
| 11,262,938 | B2 | 3/2022 | Lin |
| 11,409,651 | B2 | 8/2022 | Jean et al. |
| 11,614,885 | B2 | 3/2023 | Chen |
| 11,829,621 | B2 * | 11/2023 | Cao ................... G06F 12/0246 |
| 2018/0024745 | A1 * | 1/2018 | Lee ..................... G06F 12/0246 |
| | | | 711/103 |
| 2020/0327063 | A1 * | 10/2020 | Kang .................. G06F 12/0871 |
| 2020/0364148 | A1 | 11/2020 | Lv et al. |
| 2020/0394139 | A1 * | 12/2020 | Lee ........................ G06F 12/10 |
| 2021/0026748 | A1 | 1/2021 | Kim |
| 2021/0089470 | A1 * | 3/2021 | Hao .................... G06F 12/1027 |
| 2021/0133095 | A1 * | 5/2021 | Kim ......................... G11C 8/04 |
| 2021/0365569 | A1 | 11/2021 | Chen |
| 2021/0397370 | A1 * | 12/2021 | Chen .................... G06F 3/0638 |
| 2022/0113877 | A1 | 4/2022 | Kim et al. |
| 2022/0253388 | A1 * | 8/2022 | Zhang ................ G06F 12/0868 |

FOREIGN PATENT DOCUMENTS

| | | |
|---|---|---|
| CN | 111831581 A | 10/2020 |
| CN | 112286445 A | 1/2021 |

OTHER PUBLICATIONS

Y. Peng, L. Peng, S. Sun, L. Yin, Q. Li and J. Zhang, "FlexHMB: A Flexible HMB Design Towards Bufferless Mobile Flash, " in IEEE Transactions on Computer-Aided Design of Integrated Circuits and Systems, doi: 10.1109/TCAD.2025.3568773. (Year: 2025).*

International Search Report of the International Searching Authority directed to related International Patent Application No. PCT/CN2021/084657, mailed Jan. 4, 2022; 4 pages.

J. Hong, S. Han and E.-Y. Chung, "A RAM cache approach using host memory buffer of the NVMe interface," 2016 International SoC Design Conference (ISOCC), Jeju, Korea (South), 2016, pp. 109-110, doi: 10.1109/SOCC.2016.7799757. (Year: 2016).

J. Koo, C. Chung, Arvind and S. Lee, "A Case for Application-Managed Flash," in IEEE Transactions on Computers, vol. 70, No. 2, pp. 240-254, Feb. 1, 2021, doi: 1109/TC.2020.2987569. (Year: 2021).

K. Han, H. Kim and D. Shin, "WAL-SSD: Address Remapping-Based Write-Ahead-Logging Solid-State Disks," in IEEE Transactions on Computers, vol. 69, No. 2, pp. 260-273, Feb. 1, 2020, doi: 10.1109/TC.2019.2947897. (Year: 2020).

Jesung Kim, Jong Min Kim, S.H. Noh, Sang Lyul Min and Yookun Cho, "A space-efficient flash translation layer for CompactFlash systems," in IEEE Transactions on Consumer Electronics, vol. 48, No. 2, pp. 366-375, May 2002, doi: 10.1109/TCE.2002.1010143.

* cited by examiner

FILE SYSTEM AND HOST PERFORMANCE BOOSTER FOR FLASH MEMORY

CROSS-REFERENCE TO RELATED APPLICATIONS

This application is a continuation of U.S. application Ser. No. 17/307,083, filed on May 4, 2021, entitled "FILE SYSTEM AND HOST PERFORMANCE BOOSTER FOR FLASH MEMORY," issued as U.S. Pat. No. 11,829,621, which is a continuation of International Application No. PCT/CN2021/084657, filed on Mar. 31, 2021, entitled "FILE SYSTEM AND HOST PERFORMANCE BOOSTER FOR FLASH MEMORY," both of which are hereby incorporated by reference in their entireties.

BACKGROUND

In order to read or write a file in an operating system, the data storage system determines a logic address and a physical address of the file. The management and retrieval of the logic address and the physical address may be cumbersome for the data storage system and may limit the speed of file reading and writing processes.

SUMMARY

Some aspects of this disclosure relate to apparatuses and methods for an enhancement on a data storage system. For example, systems and methods are provided for improving read and write efficiencies of the data storage system.

Some aspects of this disclosure provide a host device comprising a memory and a processor coupled to the memory. The memory is used to store a logic-to-physical (L2P) mapping table that includes an entry mapping logical addresses of a file to physical addresses of a file. The processor is configured to generate a first configuration corresponding to a file and transmit the first configuration to a memory device. The first configuration instructs the memory device to refrain from transmitting a L2P dirty entry notification to the host device. The L2P dirty entry notification corresponds to the file.

Some aspects of this disclosure provide a memory device comprising a memory and a processor coupled to the memory. The memory controller is configured to receive, from a host device, a first configuration corresponding to a file; refrain from transmitting a logic to physical (L2P) dirty entry notification corresponding to the file to the host device; and transmit a first confirmation to the host device, wherein the first confirmation indicates refraining from transmitting the L2P dirty entry notification to the host device.

Some aspects of this disclosure provide a system comprising a host device and a memory device. The host device is configured to generate a first configuration corresponding to a file; and transmit the first configuration to a memory device. The memory device is configured to receive, from the host device, the first configuration; and refrain from transmitting a logic-to-physical (L2P) dirty entry notification corresponding to the file to the host device.

Some aspects of this disclosure relate to the system, wherein the host device is further configured to generate a second configuration corresponding to the file; and transmit the second configuration to the memory device, wherein the second configuration instructs the memory device to resume transmitting the L2P dirty entry notification corresponding to the file to the host device.

Some aspects of this disclosure provide a system, comprising a host device and a memory device. The host device comprises a first memory for storing a logic-to-physical (L2P) mapping table that includes an entry mapping logical addresses of a file to physical addresses of a file; the host device further comprises a processor coupled to the first memory, and the processor is configured to: generate a first configuration corresponding to the file; and transmit the first configuration to a memory device, wherein the first configuration instructs the memory device to refrain from transmitting a L2P dirty entry notification to the host device, and wherein the L2P dirty entry notification corresponds to the file. The memory device comprises a second memory and a memory controller coupled to the second memory; the memory controller is configured to: receive, from a host device, a first configuration corresponding to a file; refrain from transmitting a logic to physical (L2P) dirty entry notification corresponding to the file to the host device; and transmit a first confirmation to the host device, wherein the first confirmation indicates refraining from transmitting the L2P dirty entry notification to the host device.

Some aspects of this disclosure provide a method for managing a L2P mapping table of a memory device. The method comprises: receiving, from a host device coupled with the memory device, a first configuration corresponding to a file; refraining from transmitting a logic to physical (L2P) dirty entry notification corresponding to the file to the host device; and transmitting a first confirmation to the host device, wherein the first confirmation indicates refraining from transmitting the L2P dirty entry notification to the host device, This Summary is provided merely for the purpose of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
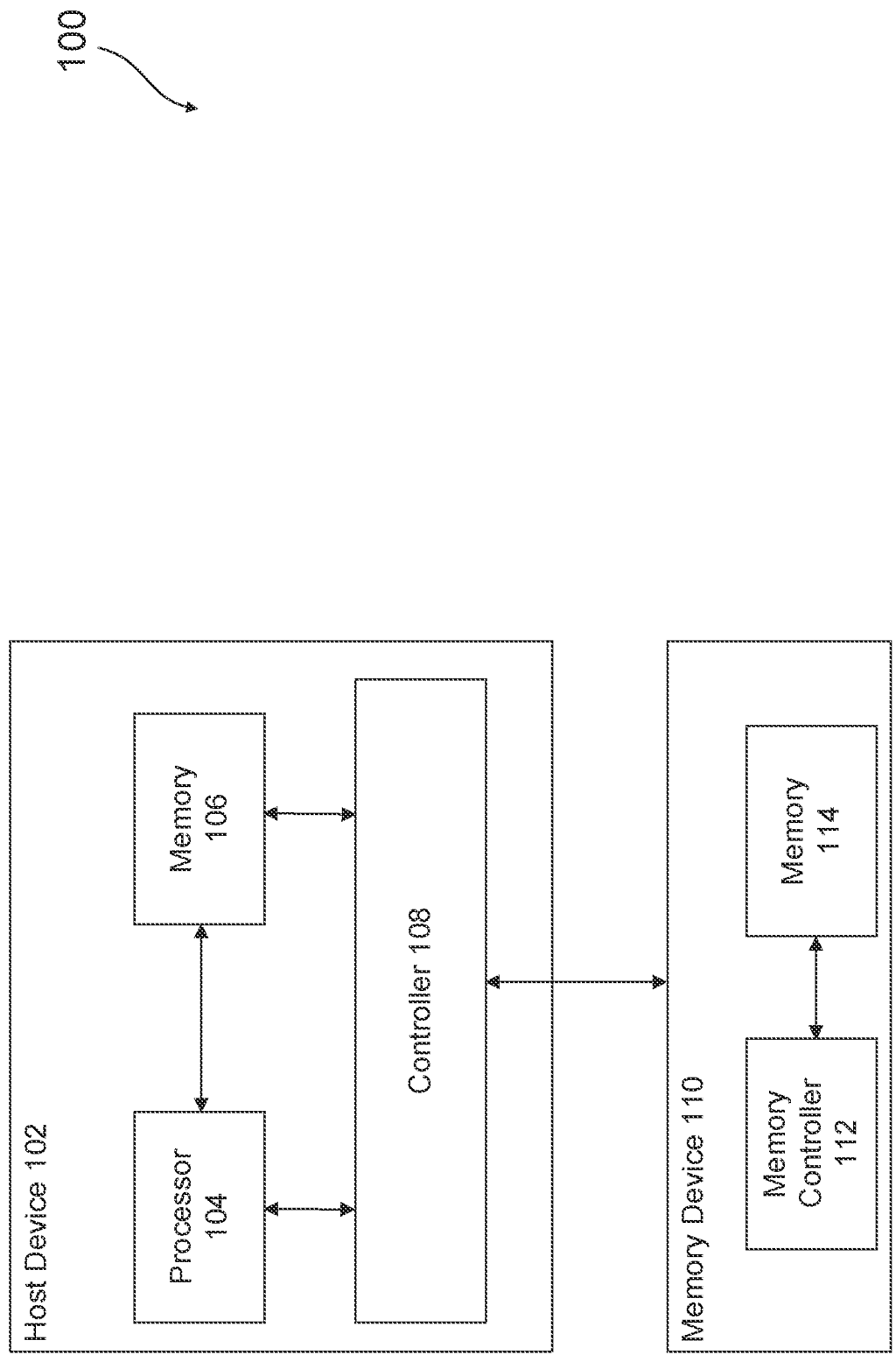
FIG. 1 illustrates an example system implementing an enhancement on a data storage system, according to some aspects of the disclosure.

Provided herein are system, apparatus, device, method and/or computer program product embodiments, and/or combinations and sub-combinations thereof, for managing a data storage system. The embodiments disclosed herein may improve write and read efficiencies of the storage system.

According to some aspects, a file in an operating system may correspond to a logical address or a physical address. The operating system may identify the file by the logical address, which may also be referred to as a virtual address. In some aspects, one or more processors of a device generate the logical address of the file and identify the file by the logical address. For example, when executing an application or a program to read a file, the one of more processors determines the logic address of the file. Subsequently, the logic address is mapped to the physical address, where data of the file is actually stored in a memory of the device. The one or more processors then retrieve the data from the memory based on the physical address.

According to some aspects, a component of the device, such as a flash translation layer (FTL), maps logical addresses to physical addresses. For example, the FTL may maintain a logical-to-physical (L2P) mapping table. Each entry of the L2P mapping table may represent a mapping relationship between a logical address and a physical address. When mapping relationship changes, the FTL updates the L2P mapping table. For example, when the physical address of the file changes, the FTL updates an entry of the L2P mapping table accordingly to map the logical address to an updated physical address. The FTL may reside in devices, including but not limited to wireless communication devices, home entertainment devices, smartphones, laptops, desktops, tablets, personal assistants, monitors, televisions, wearable devices, Internet of Things (IoT) devices, vehicle onboard devices, memory devices (i.e., eMMC NAND flash memory device, UFS NAND flash memory device), and the like.

According to some aspects, memory devices, such as a NAND flash memory device (i.e., eMMC or UFS) may utilize the L2P mapping table for reading and writing data of the file. For example, the L2P mapping table may be stored in a flash memory of the memory device. When the NAND flash memory device receives a reading request of the file, the FTL may retrieve one or more L2P entries of the L2P mapping table and translate a logical address of the file to a physical address. A processor of the NAND flash memory device may subsequently retrieve data of the file based on the physical address. When the NAND flash memory device receives a writing request of the file, the processor may perform an erase-and-write operation to write the data of the file in a physical address. For example, the processor may erase data stored in the physical address of the file and write the data of the file in the physical address. In some aspects, the processor may write the data of the file in a different physical address. For example, the processor may determine that the physical address of the file is not suitable for storing the data and locate an updated physical address. The processor, coupled to the FTL, updates the L2P mapping table to reflect such change so that the logical address maps to the updated physical address.

In some aspects, reading and writing operations described above may limit the efficiency of the NAND flash memory device. For example, in the reading operation, retrieving the one or more L2P entries of the L2P mapping table may be time-consuming. Especially when the data to be read is small and frequencies of reading are high, L2P mapping table retrieving becomes cumbersome due to the limitation of flash memory reading speed. In some aspects, the NAND flash memory device may also include a random-access memory (RAM) memory. However, the L2P mapping table may not fit in the RAM memory due to the limited size of the RAM memory. Furthermore, in the writing operation, the processor and the FTL may update the L2P mapping table every time when the physical address changes. This may likewise limit the efficiency of the NAND flash memory device similarly to the reading operation.

According to some aspects, the memory devices may connect with a host device. The host device may include a flash-friendly file System (F2FS), but is not limited to, wireless communication devices, home entertainment devices, smartphones, laptops, desktops, tablets, personal assistants, monitors, televisions, wearable devices, Internet of Things (IoT) devices, vehicle onboard devices, memory devices, and the like. The host device may include a RAM that has a larger capacity than the RAM of the memory device. In some aspects, the memory device may store the L2P mapping table in the RAM of the host device. In some aspects, a speed of the memory device reading from the RAM of the host device may be higher than a speed of the memory device reading from its own flash memory. In other words, a speed of retrieving the L2P mapping table from the RAM of the host device may be higher than a speed of retrieving the L2P mapping table from the flash memory of the memory device. Such cooperation between the memory device and the host device may also be referred to as a host performance booster (HPB) system.

In some aspects, storing the L2P mapping table in the host device improves efficiencies of the reading and writing operations. For example, as discussed above, the memory device may retrieve the one or more L2P entries of the L2P mapping table at a higher speed from the host device. In some aspects, the host device sends reading and/or writing requests to the memory device. The host device may combine the reading and/or writing requests with corresponding entries of the L2P mapping table to form a combined message and send it to the memory device. In such a case, there is no delay caused by retrieving the one or more L2P entries of the L2P mapping table.

According to some aspects, when the processor of the memory device writes data of the file in a new physical address, the one or more L2P entries of the L2P mapping table need to be updated because the logical address maps to the new physical address after the writing operation. When the host device stores the L2P mapping table, the host device needs to update the L2P mapping table stored in its RAM.

In some aspects, the memory device may mark the one or more L2P entries as dirty entries when their corresponding physical addresses change. The memory device notifies the host device that the one or more L2P entries are dirty entries. The host device may request updates of the dirty entries from the memory device to update the L2P mapping table stored in the RAM of the host device. The dirty entries become clean after the update.

According to some aspects, some entries of the L2P mapping table may become dirty entries more frequently than other entries. For example, files containing direct node blocks of directories or directory entry ("dentry") blocks may subject to change frequently. In other words, the processor of the memory device may perform writing operations frequently to change data of the files. Therefore, the entries of the L2P mapping table corresponding to the files need to be updated frequently. Consequently, to update the entries, the host device may perform writing operations to the RAM of the host device frequently for the files. Thus, the files that change frequently may have a negative impact on the performance of the HPB system.

In some aspects, the files that change frequently affect the host device because writing operations affect the performance of the host device. As shown in the Table 1 below, for example, when 70% of the operations are writing operations, the input/output operations per second (IOPS) is 13.4 k. When there are only reading operations, the IOPS is 56.1 k. Therefore, decreasing a number of writing operations may improve the performance of the host device.

TABLE 1

| Writing Operation Impact | | | | | | |
|---|---|---|---|---|---|---|
| Read/Write | 30%:70% | 50%:50% | 70%:30% | 80%:20% | 90%:10% | 100%:0% |
| IOPS | 13.4k | 15.8k | 21.3k | 26.8k | 36.8k | 56.1k |

In some aspects, the files that change frequently also affect the memory device as well. For example, the memory device may send dirty entry notifications and entry updates to the host device to report such changes of the files, which put burdens on the memory device and decrease reading and/or writing efficiencies of the memory device.

According to some aspects, the host device may identify the files that change frequently as hot files. The host device may notify the memory device to disable HPB functions on the hot files. For example, the memory device may refrain from transmitting dirty entry notifications to the host device and rely on the L2P mapping table stored in the flash memory of the memory device for the writing and reading operations. In some aspects, when the memory device determines that entries of the L2P mapping table corresponding to the hot files becomes dirty, the memory device may refrain from sending a notification to the host device. In such a case, frequent entry updates in the host device is avoided. The memory device may update the entries of the L2P mapping table in the memory device when corresponding physical addresses change. In some aspects, the memory device may ignore the entries of the hot files received from the host device in reading and/or writing requests. Instead, the FTL maps logical addresses to physical addresses based on the L2P mapping table stored in the memory device. In some aspects, the host device may refrain from sending entries of the hot files to the memory device.

According to some aspects, the host device identifies hot files based on the properties of the files. For example, the host device may determine that files containing direct node blocks of directories or dentry blocks are hot files. The host device may also identify hot files based on user requests. For example, the user may send requests to the host device identifying hot files.

According to some aspects, the host device may change statuses of hot files. For example, the host device may send a clear-hot notification to the memory device indicating that some hot files are no longer hot files. In such a case, the memory device resumes HPB operations. For example, the memory device resume sending dirty entry notifications to the host device when entries corresponding to the files become dirty.

Various embodiments of these features will now be discussed with respect to the corresponding figures.

FIG. 1 illustrates an example system 100 implementing an enhancement on a data storage system, according to some aspects of the disclosure. The system 100 can include a host device 102 and a memory device 110. The memory device 110 can be a NAND flash memory device provided in a wireless communication device, a home entertainment device, a smartphone, a laptop, a desktop, a tablet, a personal assistant, a monitor, a television, a wearable device, an Internet of Things (IoT) devices, a vehicle onboard device, and the like. The memory device 110 can include a memory controller 112 and a memory 114. The memory 114 can include a RAM memory and/or flash memory. The host device 102 can include a processor 104, a memory 106, and a controller 108. In some aspects, the host device 102 communicates with the memory device 110 via the controller 108.

According to some aspects, the host device 102 stores an L2P mapping table in the memory 106, wherein the memory 106 cancan be a RAM memory. The L2P mapping table may include entries that map logical addresses to physical addresses. For example, the processor 104 can receive a reading request of a file. The reading request may include one or more logical addresses of the file. In some aspects, the processor 104 can receive the reading request from an application. The processor 104 can retrieve one or more L2P entries of the L2P mapping table from the memory 106. The processor 104 can combine the reading request and the one or more L2P entries and send it to the controller 108. The controller 108 can transmit the combined reading request and the one or more L2P entries to the memory device 110. The memory controller 112 of the memory device 110 can retrieve the one or more logical addresses from the reading request and map the one or more logical addresses to one or more physical addresses based on the one or more L2P entries. The memory controller 112 can retrieve data from the memory 114 based on the one or more physical addresses. Upon retrieving the data, the memory device 110 can send the data to the host device 102.

In some aspects, the controller 108 can retrieve the one or more L2P entries of the L2P mapping table from the memory 106 directly. For example, the controller 108 retrieves the one or more logical addresses from the reading request received from the processor 104. Based on the one or more logical addresses, the controller 108 retrieves the one or more L2P entries of the L2P mapping table from the memory 106.

According to some aspects, the processor 104 receives a writing request of the file. The writing request may include one or more logical addresses of the file and data to be written to the file. In some aspects, the processor 104 can receive the writing request from an application. Similar to above, the controller 108 can send a combination of the writing request and the one or more L2P entries of the L2P mapping table to the memory device 110. The memory controller 112 can determine the one or more physical addresses based on the writing request and the one or more L2P entries as similarly discussed above. The memory controller 112 can determine that the one or more physical addresses are not available for writing the data. For example, the one or more physical addresses may not have enough space to store the data. The memory controller 112 can determine one or more updated physical addresses and store the data in the one or more updated physical addresses. Thus, the one or more L2P entries become dirty because the one or more logical addresses no longer map to the one or more physical addresses. The memory controller 112 generates a dirty entry notification indicating that the one or more L2P entries are dirty. The memory device 110 transmits the dirty entry notification to the host device 102. The host device 102 can request an update of the one or more L2P entries from the memory device 110 and update the one or more L2P entries in the memory 106. In some aspects, the host device 102 can request the one or more updated physical addresses and update the one or more L2P entries in the memory 106 based on the one or more updated physical addresses.

According to some aspects, the processor 104 can determine a file to be a hot file by such as F2FS (Flash Friendly File System) deposed in the host device 102. The processor 104 can determine based on the file type. For example, the processor 104 can determine that files containing direct node blocks of directories or dentry blocks are hot files. This is because these files are subject to change frequently. The processor 104 can determine that files are hot files based on user requests. Upon determining that the files are hot files, the processor 104 can notify the memory device 110 via the controller 108. For example, the processor 104 can generate a set-hot configuration and send to the controller 108, which forwards the set-hot configuration to the memory device 110. The memory device 110 can mark the files to be hot. When one or more physical addresses of the files change, the memory device 110 refrains from notifying the host device 102. Instead, the memory device 110 updates one or more L2P entries of an L2P mapping table stored in the memory 114 based on changes of the one or more physical addresses of the file.

According to some aspects, the processor 104 can determine that a file is no longer a hot file. The processor 104 can determine based on a change of file type. For example, the processor 104 can determine that the files no longer contain direct node blocks of directories or dentry blocks. The processor 104 can also determine based on user requests. For example, the processor 104 can receive a user request indicating that a file is no longer a hot file. Upon determining that the file is no longer a hot file, the processor 104 can notify the memory device 110 via the controller 108. For example, the processor 104 can generate a clear-hot configuration and send it to the controller 108, which forwards the clear-hot configuration to the memory device 110. The memory device 110 can mark that the file is no longer a hot file. When physical addresses of the file change, the memory device 110 resumes notifying the host device 102.

Figure 2:
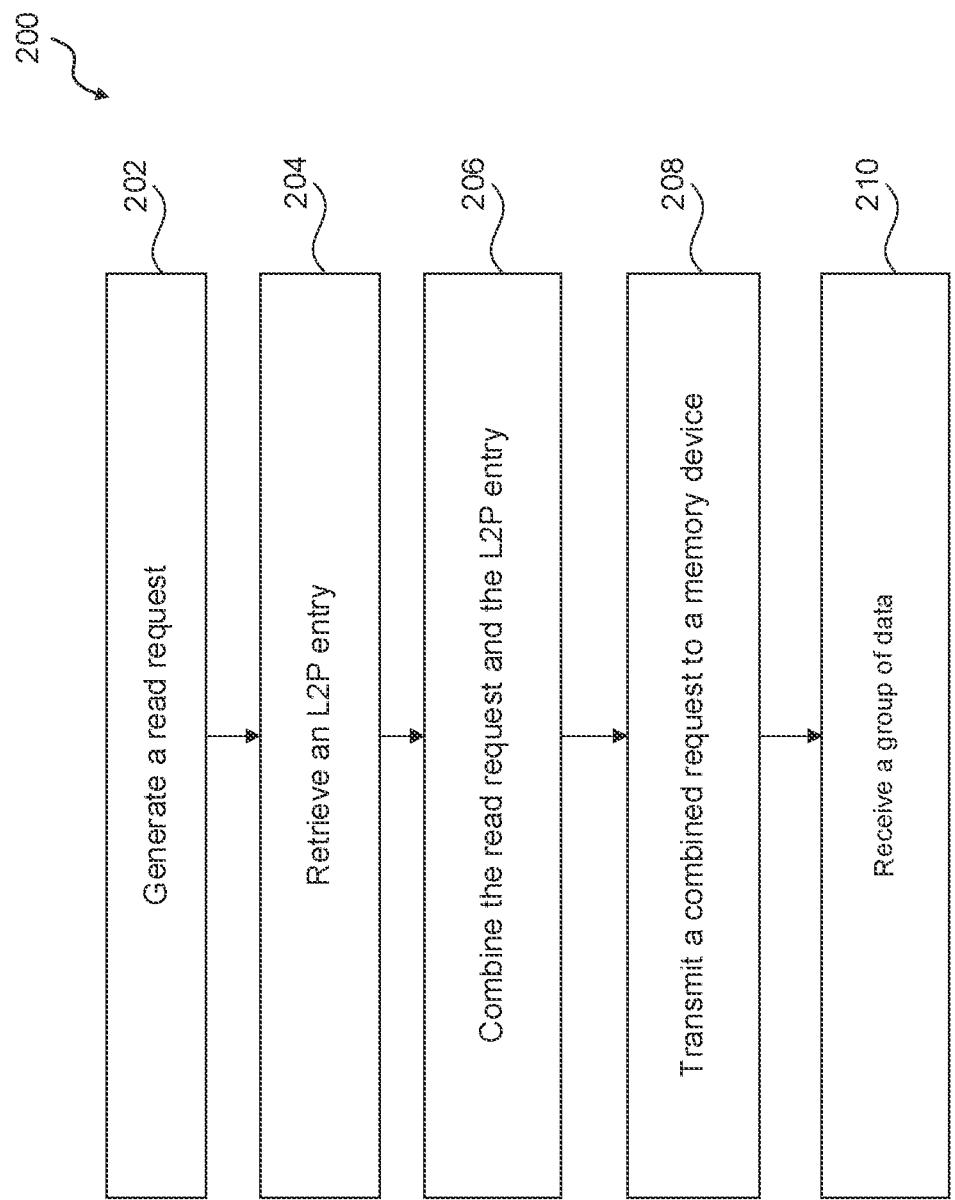
FIG. 2 illustrates an example method for reading from a memory device, according to aspects of the disclosure.

FIG. 2 illustrates an example method for reading from a memory device, according aspects of the disclosure. As a convenience and not a limitation, FIG. 2 may be described with regard to elements of FIGS. 1 and 7. Method 200 can represent the operation of an electronic device (for example, the host devices 102 of FIG. 1) implementing the reading operation. Method 200 can also be performed by computer system 700 of FIG. 7. But method 200 is not limited to the specific aspects depicted in those figures and other systems may be used to perform the method, as will be understood by those skilled in the art. It is to be appreciated that not all operations may be needed, and the operations may not be performed in the same order as shown in FIG. 2.

At 202, the electronic device may generate a read request. For example, the electronic device generates the read request for reading a group of data of a file. The read request may include one or more logical addresses of the file.

At 204, the electronic device may retrieve an L2P entry corresponding to the file or the one or more logical addresses. For example, the electronic device may retrieve the L2P entry from an L2P mapping table stored in the electronic device.

At 206, the electronic device may combine the read request and the L2P entry. For example, the electronic device may generate a combined request including the read request and the L2P entry. The electronic device may also encrypt the combined request.

At 208, the electronic device may transmit the combined request to a memory device, such as the memory device 110 of FIG. 1.

At 210, the electronic device may receive a group of data from the memory device, wherein the group of data corresponds to the file.

Figure 3:
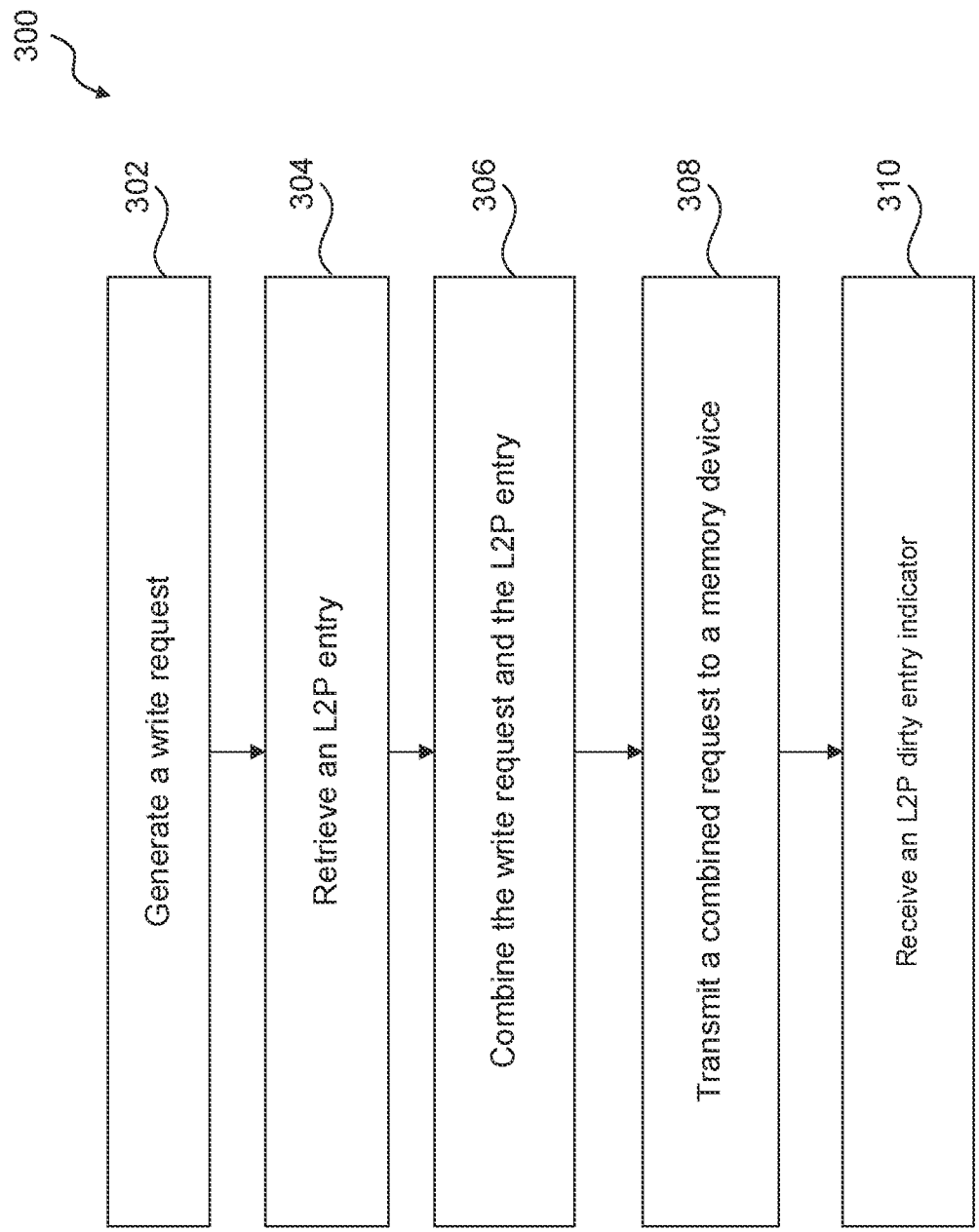
FIG. 3 illustrates an example method for writing in the memory device, according to aspects of the disclosure.

FIG. 3 illustrates an example method for writing to a memory device, according to aspects of the disclosure. As a convenience and not a limitation, FIG. 3 may be described with regard to elements of FIGS. 1 and 7. Method 300 can represent the operation of an electronic device (for example, the host devices 102 of FIG. 1) implementing the writing operation. Method 300 can also be performed by computer system 700 of FIG. 7. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the electronic device may generate a write request. For example, the electronic device generates the write request for writing a group of data of a file. The write request may include one or more logical addresses of the file and the group of data.

At 304, the electronic device may retrieve an L2P entry corresponding to the file or the one or more logical addresses. For example, the electronic device may retrieve the L2P entry from an L2P mapping table stored in the electronic device.

At 306, the electronic device may combine the write request and the L2P entry. For example, the electronic device may generate a combined request including the write request and the L2P entry. The electronic device may also encrypt the combined request.

At 308, the electronic device may transmit the combined request to a memory device, such as the memory device 110 of FIG. 1.

At 310, the electronic device may receive an L2P dirty entry notification from the memory device, wherein the L2P dirty entry notification corresponds to the L2P entry of the L2P mapping table.

Figure 4:
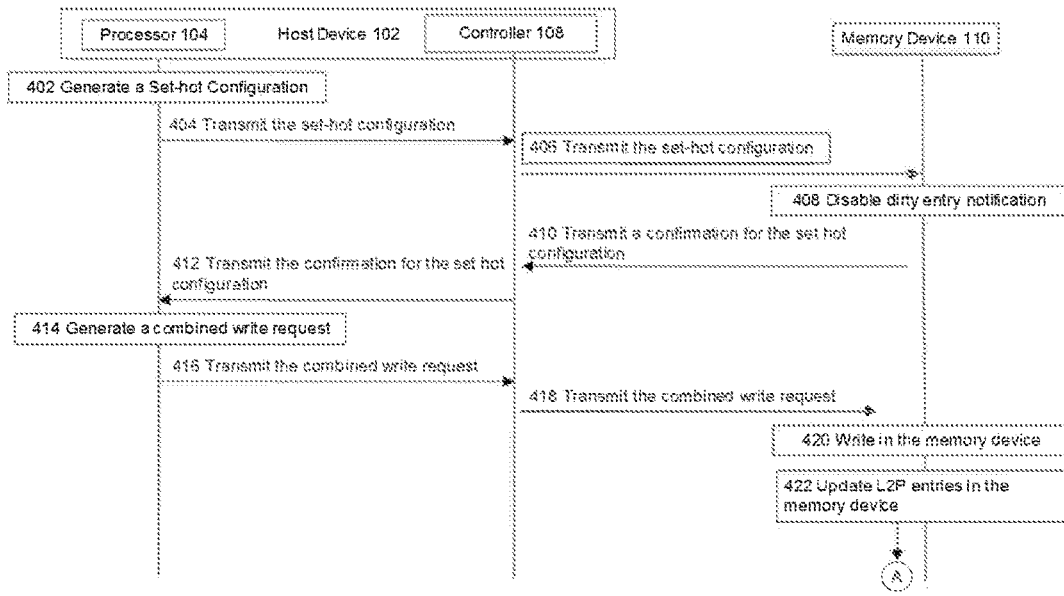
FIG. 4 illustrates an example method for managing a logical-to-physical (L2P) mapping table with a set-hot configuration.
Figure 4:
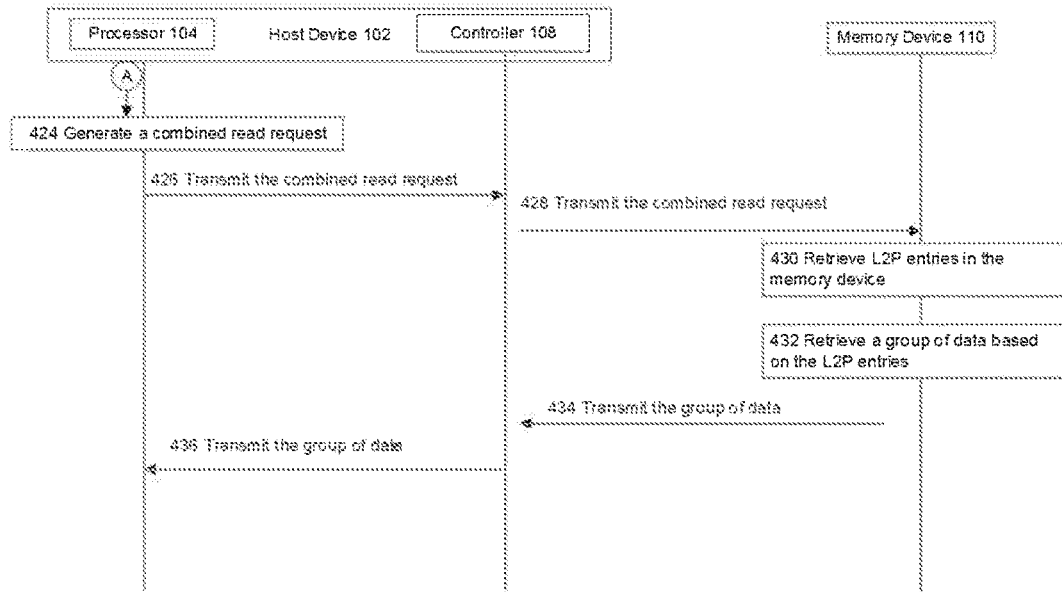

FIG. 4 illustrates an example method for managing an L2P mapping table with a set-hot configuration. As a convenience and not a limitation, FIG. 4 may be described with regard to elements of FIGS. 1 and 7. Method 400 can represent the operation of electronic devices (for example, the host devices 102 and the memory device 110 of FIG. 1) managing the L2P mapping table with a set-hot configuration. Method 400 can also be performed by computer system 700 of FIG. 7. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the processor 104 of the host device 102 generates a set-hot configuration corresponding to a file. The processor 104 can determine the file to be a hot file. The processor 104 can determine based on a file type. For example, the processor 104 can determine that files containing direct node blocks of directories or dentry blocks are hot files. This is because these files are subject to change frequently. The processor 104 can also determine that files are hot files based on user requests.

At 404, the processor 104 transmits the set-hot configuration to the controller 108.

At 406, the controller 108 transmits the set-hot configuration to the memory device 110. In some aspects, the controller 108 can forward the set-hot configuration generated by the processor 104. The controller 108 can also generate and transmit a new set-hot configuration that is compatible with the memory device 110 based on the set-hot configuration received. In some aspects, the controller 108 can encrypt the set-hot configuration before transmitting.

At 408, the memory device 110 disables dirty entry notifications. For example, the memory device 110 can refrain from notifying the host device 102 when an L2P entry of an L2P mapping table corresponding to the file becomes dirty. In some aspects, the memory device may ignore L2P entries of the file received from the host device 102. In some aspects, upon receiving the set-hot configuration from the controller 108, the memory device 110 can decrypt the set-hot configuration.

At 410, the memory device 110 transmits a confirmation for the set-hot configuration to the controller 108 of the host device 102. The confirmation indicates that the memory device 110 no longer transmits dirty entry notification corresponding to the file to the host device 102.

At 412, the controller 108 transmits the confirmation for the set-hot configuration to the processor 104.

At 414, the processor 104 generates a combined write request similarly as described in 306 of FIG. 3. The combined request may include one or more logical addresses of a file, one or more L2P entries of the L2P mapping table, and a group of data to be written in the file.

At 416, the processor 104 transmits the combined write request to the controller 108.

At 418, the controller 108 transmits the combined write request to the memory device 110. In some aspects, the controller 108 can also encrypt the combined write request.

At 420, the memory device 110 writes the group of data in a memory, such as the memory 114 of the memory device 110 in FIG. 1. In some aspects, the memory device 110 determines one or more physical addresses of the memory 114 based on the write request. For example, the memory device 110 retrieves the one or more logical addresses and the one or more L2P entries of the L2P mapping table from the write request. The memory device 110 maps the one or more logical addresses to the one or more physical addresses based on the one or more L2P entries of the L2P mapping table. The memory device 110 can determine that the one or more physical addresses are not suitable for storing the group of data contained in the write request based on available spaces in the one or more physical addresses. The memory device 110 can determine one or more updated physical addresses and store the group of data in the one or more updated physical addresses. In such a case, the one or more L2P entries of the L2P mapping table in the host device 102 becomes dirty entries because the one or more logical addresses map to the one or more updated physical addresses.

In some aspects, upon receiving the combined write request, the memory device 110 decrypt the combined write request.

At 422, the memory device 110 updates one or more L2P entries of an L2P mapping table stored in the memory 114 of the memory device 110 based on the one or more updated physical addresses.

In some aspects, because the memory device 110 disabled the dirty entry notification in step 408 as described above, the memory device 110 refrains from transmitting a notification regarding the dirty entries of the L2P mapping table in the host device 102.

At 424, the processor 104 generates a combined read request similarly as described in 206 of FIG. 2. The combined read request includes the one or more logical addresses of the file and the one or more L2P entries of the L2P mapping table stored in the host device 102.

At 426, the processor 104 transmits the combined read request to the controller 108.

At 428, the controller 108 transmits the combined read request to the memory device 110. In some aspects, the controller 108 can also encrypt the combined read request.

At 430, the memory device 110 retrieve the one or more updated L2P entries stored in the memory device 110. For example, the memory device 110 retrieves the one or more logical addresses of the file from the combined read request received. The memory device 110 retrieves the one or more updated L2P entries from the memory 114 of the memory device 110 based on the one or more logical addresses. In some aspects, the memory device may ignore the one or more L2P entries received in the combined read request.

At 432, the memory device 110 retrieves the group of data based on the one or more updated physical addresses. For example, the memory device 110 determines the one or more updated physical addresses based on the one or more logical addresses and the one or more updated L2P entries. The memory device retrieves the group of data, based on the one or more updated physical addresses, stored in the memory 114 of the memory device 110.

At 434, the memory device 110 transmits the group of data to the controller 108.

At 436, the controller 108 transmits the group of data to the processor 104.

Figure 5:
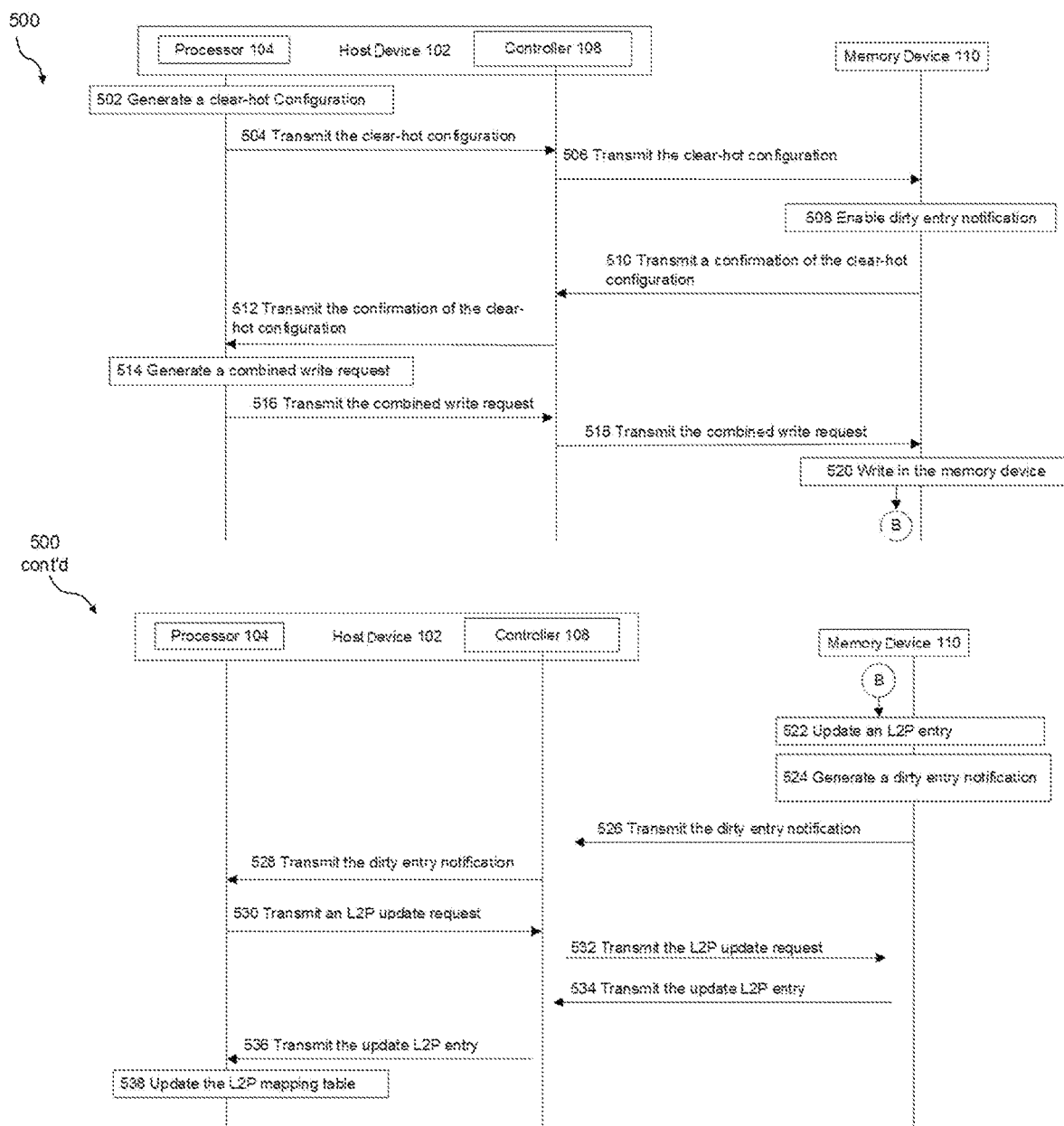
FIG. 5 illustrates an example method for managing an L2P mapping table with a clear-hot configuration.

FIG. 5 illustrates an example method for managing an L2P mapping table with a clear-hot configuration. As a convenience and not a limitation, FIG. 5 may be described with regard to elements of FIGS. 1 and 7. Method 500 can represent the operation of electronic devices (for example, the host devices 102 and the memory device 110 of FIG. 1) managing the L2P mapping table with a clear-hot configuration. Method 500 can also be performed by computer system 700 of FIG. 7. But method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

At 502, the processor 104 of the host device 102 generates a clear-hot configuration corresponding to a file. The processor 104 can determine that the file is no longer a hot file. The processor 104 can determine based on a change of a file type. For example, the processor 104 can determine that the file no longer contains direct node blocks of directories or dentry blocks are hot files. The processor 104 can determine that the file is no longer a hot file based on user requests.

At 504, the processor 104 transmits the clear-hot configuration to the controller 108.

At 506, the controller 108 transmits the clear-hot configuration to the memory device 110. In some aspects, the controller 108 can forward the clear-hot configuration generated by the processor 104. The controller 108 can also generate and transmit a new clear-hot configuration that is compatible with the memory device 110 based on the clear-hot configuration received. In some aspects, the controller 108 can encrypt the clear-hot configuration before transmitting.

At 508, the memory device 110 enables dirty entry notifications based on the clear-hot configuration received. For example, the memory device 110 can resume notifying the host device 102 when an L2P entry of an L2P mapping table corresponding to the file becomes dirty. In some aspects, the memory device may resume using L2P entries of the file received from the host device 102. In some aspects, upon receiving the clear-hot configuration from the controller 108, the memory device 110 can decrypt the clear-hot configuration.

In some implementation, at 508, the updated L2P entries obtained at 422 could be uploaded to the memory 106 in the host device 102. Thus, the updated L2P entries can be resumed to using.

At 510, the memory device 110 transmits a confirmation for the clear-hot configuration to the controller 108 of the host device 102. The confirmation indicates that the memory device 110 resumed transmitting dirty entry notifications corresponding to the file to the host device 102.

At 512, the controller 108 transmits the confirmation for the clear-hot configuration to the processor 104.

At 514, the processor 104 generates a combined write request similarly as described in 306 of FIG. 3. The combined request may include one or more logical addresses of a file, one or more L2P entries of the L2P mapping table, and a group of data to be written in the file.

At 516, the processor 104 transmits the combined write request to the controller 108.

At 518, the controller 108 transmits the combined write request to the memory device 110. In some aspects, the controller 108 can also encrypt the combined write request.

At 520, the memory device 110 writes the group of data in a memory, such as the memory 114 of the memory device 110 in FIG. 1. In some aspects, the memory device 110 determines one or more physical addresses of the memory 114 based on the write request. For example, the memory device 110 retrieves the one or more logical addresses and the one or more L2P entries of the L2P mapping table from the write request. The memory device 110 maps the one or more logical addresses to the one or more physical addresses based on the one or more L2P entries of the L2P mapping table. The memory device 110 can determine that the one or more physical addresses are not suitable for storing the group of data contained in the write request based on available spaces in the one or more physical addresses. The memory device 110 can determine one or more updated physical addresses and store the group of data in the one or more updated physical addresses. In such a case, the one or more L2P entries of the L2P mapping table in the host device 102 becomes dirty entries because the one or more logical addresses map to the one or more updated physical addresses.

In some aspects, upon receiving the combined write request, the memory device 110 decrypt the combined write request.

At 522, the memory device 110 updates one or more L2P entries of an L2P mapping table stored in the memory 114 of the memory device 110 based on the one or more updated physical addresses.

At 524, the memory device generates a dirty entry notification. In some aspects, the dirty entry notification indicates that the one or more L2P entries of the L2P mapping table stored in the memory 106 of the host device 102 became dirty. According to some aspects, the memory device may include the one or more updated L2P entries in the dirty entry notification.

At 526, the memory device transmits the dirty entry notification to the controller 108 of the host device 102.

At 528, the controller 108 transmits the dirty entry notification to the processor 104.

At 530, the processor 104 transmits an L2P update request to the controller 108. The L2P update request may include identifications of the one or more L2P entries indicated in the dirty entry notification. In some aspects, the L2P update request may include an identification of the dirty entry notification received from the memory device 110.

At 532, the controller 108 transmits the L2P update request to the memory device 110.

At 534, the memory device 110 transmits the one or more updated L2P entries to the controller 108. In some aspects, the memory device 110 can retrieve the one or more updated L2P entries based on the identifications of the one or more updated L2P entries received from the host device 102. The memory device 110 can also retrieve the one or more updated L2P entries based on the identification of the dirty entry notification.

At 536, the controller 108 transmits the one or more updated L2P entries to the processor 104.

At 538, the processor 104 updates the L2P mapping table stored in the memory 106 based on the one or more updated L2P entries received from the memory device 110.

Figure 6:
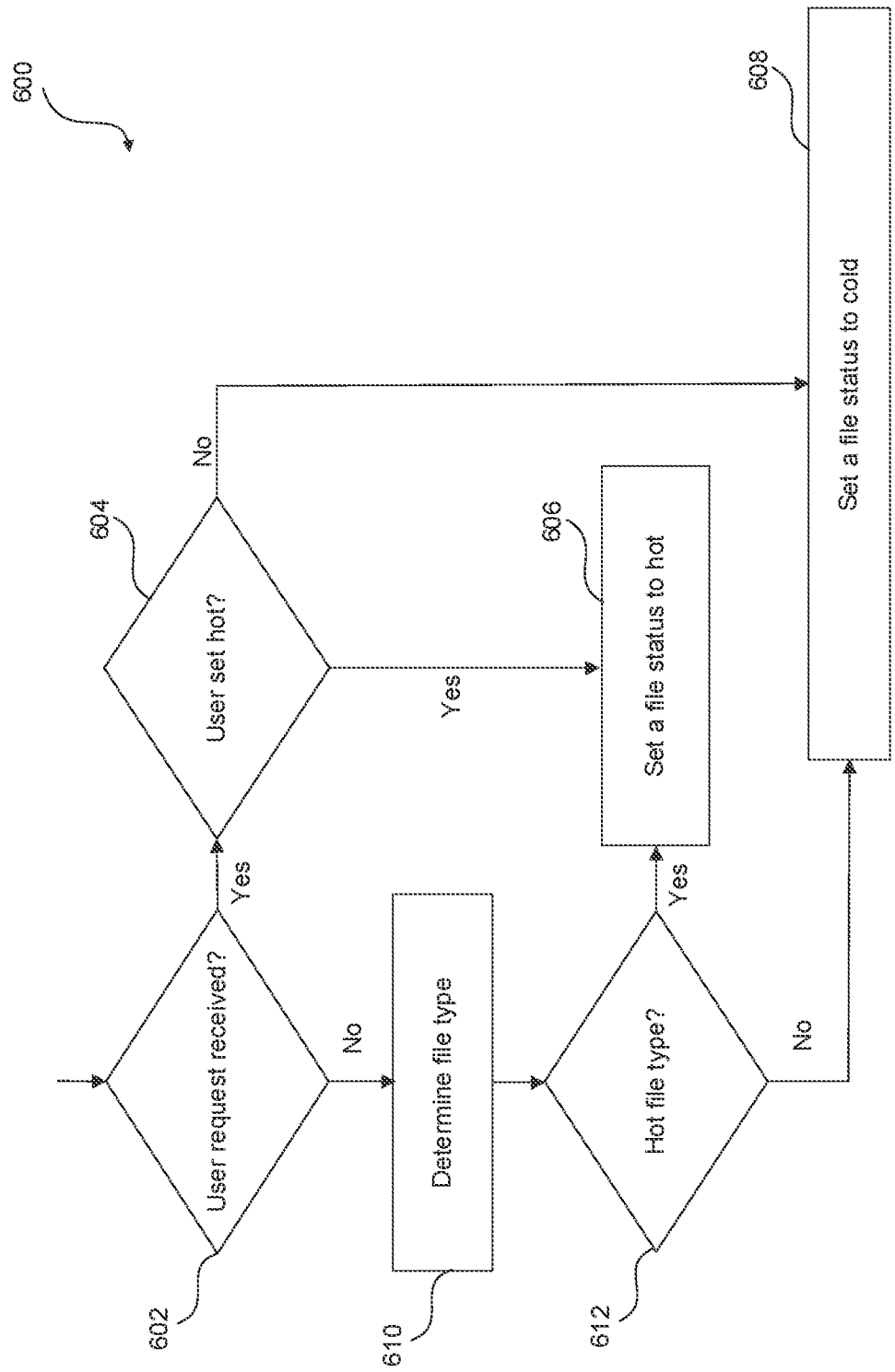
FIG. 6 illustrates an example method for generating set-hot and clear-hot configurations.

FIG. 6 illustrates an example method for generating set-hot and clear-hot configurations. As a convenience and not a limitation, FIG. 6 may be described with regard to elements of FIGS. 1 and 7. Method 600 can represent the operation of an electronic device (for example, the host devices 102 of FIG. 1) generating set-hot and clear-hot configurations. Method 600 can also be performed by computer system 700 of FIG. 7. But method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

At 602, the electronic device determines whether a user request corresponding to a file is received. The user request indicates whether the file is a hot file. If the electronic device determines that the user request is received, the control moves to 604.

At 604, the electronic device determines whether the user request instructs to set the file as a hot file. If yes, the control moves to 606.

At 606, the electronic device generates a set-hot configuration corresponding to the file as discussed in 402 of FIG. 4 above.

Referring back to 604, if the user request instructs not to set the file as a hot file, the control moves to 608.

At 608, the electronic device generates a clear-hot configuration corresponding to the file as discussed in 502 of FIG. 5 above.

Referring back to 602, if the electronic device determines that no user request is received, the control moves to 610.

At 610, the electronic device determines a file type of the file by such as F2FS (Flash Friendly File System).

At 612, the electronic device determines whether the file type is one of the hot file types. For example, a hot file type may indicate that the file includes direct node blocks of directories or dentry blocks. If the electronic device determines that the file type is one of the hot file types, the control moves to 606 to set the file as a hot file.

If the electronic device determines that the file type is no one of the hot file types, the control moves to 608 to set the file as a code file by generating a clear-hot configuration as described above.

Figure 7:
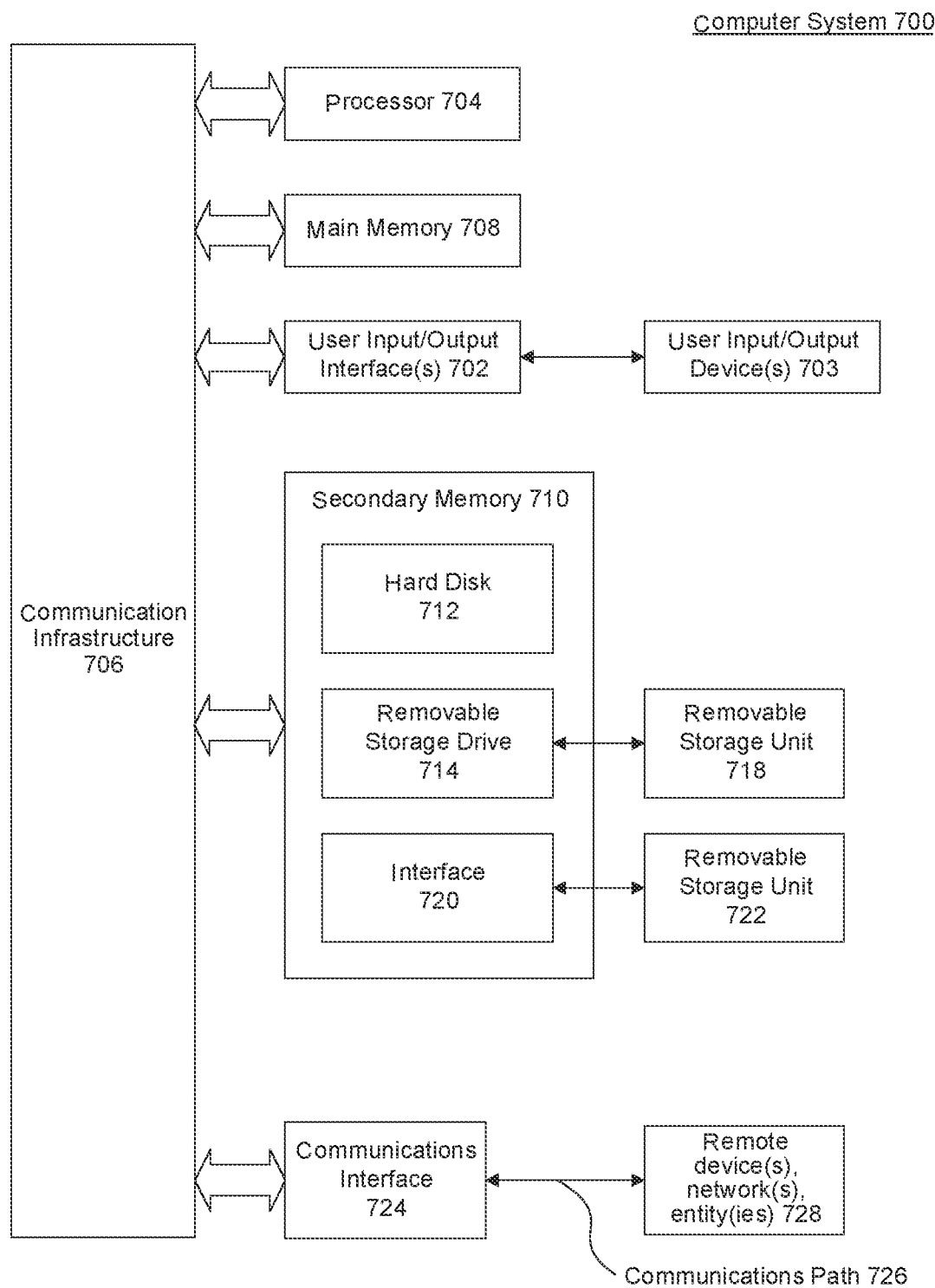
FIG. 7 is an example computer system for implementing some aspects of the disclosure or portion(s) thereof.

Various aspects may be implemented, for example, using one or more computer systems, such as computer system 700 shown in FIG. 7. Computer system 700 can be any well-known computer capable of performing the functions described herein such as the host device 102 and the memory device 110 of FIG. 1. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 can include one or more levels of cache. Main memory 708 has stored therein control logic (e.g., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 can include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

In summary, the present disclosure describes various embodiments of a memory storage system and methods of making the same.

Some aspects of this disclosure provide a host device comprising a memory and a processor coupled to the memory. The memory is used to store a logic-to-physical (L2P) mapping table that includes an entry mapping logical addresses of a file to physical addresses of a file. The processor is configured to generate a first configuration corresponding to a file and transmit the first configuration to a memory device. The first configuration instructs the memory device to refrain from transmitting a L2P dirty entry notification to the host device. The L2P dirty entry notification corresponds to the file.

Some aspects of this disclosure relate to the host device, wherein the host device further comprises a controller. The controller is coupled to the memory and the process, and is configured to drive the memory device.

Some aspects of this disclosure relate to the host device, wherein the processor is further configured to generate a read request to retrieve a group of data from the memory device, wherein the group of data corresponds to the file; generate a combined request by combining the read request with the L2P entry; and transmit the combined request to the memory device.

Some aspects of this disclosure relate to the host device, wherein the processor is further configured to generate a write request to write a group of data into the memory device, wherein the group of data corresponds to the file; generate a combined request by combining the write request with the L2P entry; and transmit the combined request to the memory device.

Some aspects of this disclosure relate to the host device, wherein the processor is further configured to generate the first configuration corresponding to the file by determining that the file includes direct node blocks of directories or directory entry blocks, or receiving a user request corresponding to the file.

Some aspects of this disclosure relate to the host device, wherein the least one processor is further configured to generate the first configuration corresponding to the file by determining the file to be a hot file through a flash-friendly file System (F2FS) deposed in the host device.

Some aspects of this disclosure relate to the host device, wherein the processor is further configured to generate a second configuration corresponding to the file and transmit the second configuration to the memory device. The second configuration instructs the memory device to resume transmitting the L2P dirty entry notification corresponding to the file to the host device.

Some aspects of this disclosure relate to the host device, wherein the processor is further configured to receive the L2P dirty entry notification from the memory device; transmit an L2P mapping update request to the memory device; receive an L2P mapping update from the memory device; and update the L2P entry of the file in the L2P mapping table based on the L2P mapping update.

Some aspects of this disclosure relate to the host device, wherein the first configuration includes a set-hot configuration corresponding to the file, and the second configuration includes a clear-hot configuration corresponding to the file.

Some aspects of this disclosure relate to the host device, wherein the memory includes a RAM memory.

Some aspects of this disclosure relate to the host device, wherein the host device is provided with a host performance booster (HPB) system, and the processor is further configured to, in response to refraining from transmitting a L2P dirty entry notification to the host device, disable HPB functions of the HPB system on the file.

Some aspects of this disclosure relate to the host device, wherein the processor is further configured to, in response to resuming transmitting the L2P dirty entry notification, enable HPB functions of the HPB system on the file.

Some aspects of this disclosure provide a memory device comprising a memory and a processor coupled to the memory. The memory controller is configured to receive, from a host device, a first configuration corresponding to a file; refrain from transmitting a logic to physical (L2P) dirty entry notification corresponding to the file to the host device; and transmit a first confirmation to the host device, wherein the first confirmation indicates refraining from transmitting the L2P dirty entry notification to the host device.

Some aspects of this disclosure relate to the memory device, wherein the memory controller is further configured to receive a combined request from the host device, wherein the combined request includes a read request and an L2P entry of the file; determine a logic address of the file based on the read request; determine a physical address of the file based on the logic address and the L2P entry; retrieve, from the memory, a group of data based on the physical address; and transmit the group of data to the host device.

Some aspects of this disclosure relate to the memory device, wherein the memory controller is further configured to decrypt the combined request.

Some aspects of this disclosure relate to the memory device, wherein the memory controller is further configured to receive a combined request from the host device, wherein the combined request includes a write request and an L2P entry of the file; determine a logic address of the file based on the write request; determine a physical address of the file based on the logic address and the L2P entry; determine a second physical address; and write a group of data in the second physical address.

Some aspects of this disclosure relate to the memory device, wherein the memory controller is further configured to update the L2P entry based on the second physical address; and store the updated L2P entry in the memory.

Some aspects of this disclosure relate to the memory device, wherein the memory controller is further configured to receive a second configuration corresponding to the file from the host device; resume transmitting the L2P dirty entry notification corresponding to the file to the host device based on the second configuration; and transmit a second confirmation to the host device, wherein the second confirmation indicates resuming transmitting the L2P dirty entry notification to the host device.

Some aspects of this disclosure relate to the memory device, wherein the memory controller is further configured to receive a combined request from the host device, wherein the combined request includes a write request and an L2P entry of the file; determine a logic address of the file based on the write request; determine a physical address of the file based on the logic address and the L2P entry; determine a second physical address; update the L2P entry based on the second physical address; and transmit the L2P dirty entry notification corresponding to the updated L2P entry to the host device based on the second configuration.

Some aspects of this disclosure relate to the memory device, wherein the memory controller is further configured to receive an L2P mapping update request from the host device; and transmit the update L2P entry to the host device.

Some aspects of this disclosure relate to the memory device, wherein the memory includes a RAM memory for storing a logic-to-physical (L2P) mapping table that includes an entry mapping logical addresses of the file to physical addresses of the file, and a NAND flash memory.

Some aspects of this disclosure relate to the memory device, wherein the first configuration includes a set-hot configuration corresponding to the file, and the second configuration includes a clear-hot configuration corresponding to the file.

Some aspects of this disclosure provide a system comprising a host device and a memory device. The host device is configured to generate a first configuration corresponding to a file; and transmit the first configuration to a memory device. The memory device is configured to receive, from the host device, the first configuration; and refrain from transmitting a logic-to-physical (L2P) dirty entry notification corresponding to the file to the host device.

Some aspects of this disclosure relate to the system, wherein the host device is further configured to generate a second configuration corresponding to the file; and transmit the second configuration to the memory device, wherein the second configuration instructs the memory device to resume transmitting the L2P dirty entry notification corresponding to the file to the host device.

Some aspects of this disclosure relate to the system, wherein the memory device is further configured to receive a second configuration from the host device; resume transmitting the L2P dirty entry notification corresponding to the file to the host device based on the second configuration; and transmit a confirmation to the host device, wherein the confirmation indicates resuming transmitting the L2P dirty entry notification to the host device.

Some aspects of this disclosure relate to the system, wherein the memory device is further configured to receive an L2P entry from the host device; update the L2P entry; and transmit the updated L2P entry to the host device based on the second configuration.

Some aspects of this disclosure relate to the system, wherein the host device is provided with a host performance booster (HPB) system, and a processor of host device is configured to, in response to refraining from transmitting a L2P dirty entry notification to the host device, disable HPB functions of the HPB system on the file.

Some aspects of this disclosure relate to the system, wherein the processor is further configured to, in response to resuming transmitting the L2P dirty entry notification, enable HPB functions of the HPB system on the file.

Some aspects of this disclosure provide a system, comprising a host device and a memory device. The host device comprises a first memory for storing a logic-to-physical (L2P) mapping table that includes an entry mapping logical addresses of a file to physical addresses of a file; the host device further comprises a processor coupled to the first memory, and the processor is configured to: generate a first configuration corresponding to the file; and transmit the first configuration to a memory device, wherein the first configuration instructs the memory device to refrain from transmitting a L2P dirty entry notification to the host device, and wherein the L2P dirty entry notification corresponds to the file. The memory device comprises a second memory and a memory controller coupled to the second memory; the memory controller is configured to: receive, from a host device, a first configuration corresponding to a file; refrain from transmitting a logic to physical (L2P) dirty entry notification corresponding to the file to the host device; and transmit a first confirmation to the host device, wherein the first confirmation indicates refraining from transmitting the L2P dirty entry notification to the host device.

Some aspects of this disclosure provide a method for managing a L2P mapping table of a memory device. The method comprises: receiving, from a host device coupled with the memory device, a first configuration corresponding to a file; refraining from transmitting a logic to physical (L2P) dirty entry notification corresponding to the file to the host device; and transmitting a first confirmation to the host device, wherein the first confirmation indicates refraining from transmitting the L2P dirty entry notification to the host device, Some aspects of this disclosure relate to the method, wherein the method further comprises: decrypting the combined request.

Some aspects of this disclosure relate to the method, wherein the method further comprises: receiving a combined request from the host device, wherein the combined request includes a write request and an L2P entry of the file; determining a logic address of the file based on the write request; determining a physical address of the file based on the logic address and the L2P entry; determining a second physical address; and writing a group of data in the second physical address.

Some aspects of this disclosure relate to the method, wherein the method further comprises: updating the L2P entry based on the second physical address; and storing the updated L2P entry in the memory.

Some aspects of this disclosure relate to the method, wherein the first configuration includes a set-hot configuration corresponding to the file, and the second configuration includes a clear-hot configuration corresponding to the file.

The Summary and Abstract sections can set forth one or more but not all exemplary embodiments of the present disclosure as contemplated by the inventor(s), and thus, are not intended to limit the present disclosure and the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for managing a logic to physical (L2P) mapping table of a memory device, comprising:
receiving, from a host device coupled with the memory device, a first configuration indicating that a first file is designated as a hot file;
in response to receiving the first configuration, transmitting a first confirmation to the host device without transmitting a L2P dirty entry notification associated with the first file;
receiving a second configuration corresponding to a second file from the host device;
transmitting the L2P dirty entry notification associated with the second file to the host device based on the second configuration, wherein the L2P dirty entry notification indicates that a L2P entry of the L2P mapping table stored in the host device has become dirty; and
in response to receiving the second configuration, transmitting a second confirmation to the host device.

2. The method of claim 1, further comprising:
receiving a combined request from the host device, wherein the combined request includes a read request and the L2P entry of the second file;
determining a logic address of the second file based on the read request;
determining a physical address of the second file based on the logic address and the L2P entry;
retrieving, from a memory of the memory device, a group of data based on the physical address; and
transmitting the group of data to the host device.

3. The method of claim 2, further comprising: decrypting the combined request.

4. The method of claim 1, further comprising:
receiving a combined request from the host device, wherein the combined request includes a write request and the L2P entry of the second file;
determining a logic address of the second file based on the write request;
determining a physical address of the second file based on the logic address and the L2P entry;
determining a second physical address; and
writing a group of data in the second physical address.

5. The method of claim 4, further comprising:
updating the L2P entry based on the second physical address; and
storing the updated L2P entry in the memory.

6. The method of claim 1, wherein the first configuration includes a set-hot configuration corresponding to the first file, and the set-hot configuration indicates that the first file is designated as the hot file in case that the first file comprises direct node blocks of directories or dentry blocks.

7. The method of claim 1, further comprising:
receiving a combined request from the host device, wherein the combined request includes a write request and the L2P entry of the second file;
determining a logic address of the second file based on the write request;
determining a physical address of the second file based on the logic address and the L2P entry;
determining a second physical address;
updating the L2P entry based on the second physical address; and
transmitting the L2P dirty entry notification corresponding to the updated L2P entry to the host device based on the second configuration.

8. The method of claim 7, further comprising:
receiving an L2P mapping update request from the host device; and
transmitting the updated L2P entry to the host device.

9. The method of claim 1, wherein the second configuration includes a clear-hot configuration corresponding to the second file.

10. A method for managing a logic to physical (L2P) mapping table of a host device, comprising:
designating a first file as a hot file;
transmitting, from the host device, a first configuration for instructing a memory device to not to transmit a L2P dirty entry notification associated with the first file to the host device,
transmitting a second configuration corresponding to a second file to the memory device; and
receiving the L2P dirty entry notification associated with the second file from the memory device based on the second configuration, wherein the L2P dirty entry notification associated with the second file indicates that a L2P entry of the L2P mapping table has become dirty.

11. The method of claim 10, further comprising:
generating a combined request comprising the L2P entry and a read request to retrieve a group of data from the memory device; and
transmitting the combined request to the memory device.

12. The method of claim 10, further comprising:
generating a combined request comprising the L2P entry and a write request to write a group of data into the memory device, and
transmitting the combined request to the memory device.

13. The method of claim 10, wherein the first configuration includes a set-hot configuration corresponding to the first file, the set-hot configuration indicates that the first file is designated as the hot file in case that the first file comprises direct node blocks of directories or dentry blocks.

14. The method of claim 10, further comprising:
transmitting an L2P mapping update request to the memory device;
receiving an L2P mapping update from the memory device; and
updating the L2P entry of the second file in the L2P mapping table based on the L2P mapping update.

15. The method of claim 10, wherein the second configuration includes a clear-hot configuration corresponding to the second file.

16. A system, comprising:
a host device comprising:
a first memory for storing a logic-to-physical (L2P) mapping table that includes L2P entry mapping logical addresses to physical addresses; and
a processor coupled to the first memory and configured to:
transmit, to a memory device, a first configuration indicating that a first file is designated as a hot file,
transmit, to the memory device, a second configuration indicates a second file is designated as a cold file,
receive a logic to physical (L2P) dirty entry notification associated with the second file based on the second configuration, wherein the L2P dirty entry notification indicates that a L2P entry of the L2P mapping table stored in the host device has become dirty, and
receive an updated L2P entry from the memory device; and
the memory device comprising:
a second memory; and
a memory controller coupled to the second memory and configured to:
receive, from the host device, the first configuration;
in response to receiving the first configuration, transmit a first confirmation to the host device without transmitting the L2P dirty entry notification associated with the first file,
receive, from the host device, the second configuration;
transmit the L2P dirty entry notification associated with the second file to the host device based on the second configuration; and
in response to receiving the second configuration, transmit a second confirmation to the host device.

17. The system of claim 16, wherein the first configuration includes a set-hot configuration corresponding to the first file, and the set-hot configuration indicates that the first file is designated as the hot file in case that the first file comprises direct node blocks of directories or dentry blocks.

18. The system of claim 16, wherein the memory controller is further configured to:
receive a combined request from the host device, wherein the combined request includes a read request and the L2P entry of the second file;
determine a logic address of the second file based on the read request;
determine a physical address of the second file based on the logic address and the L2P entry;
retrieve a group of data based on the physical address; and
transmit the group of data to the host device.

19. The system of claim 18, wherein the memory controller is further configured to decrypt the combined request.

20. The system of claim 16, wherein the memory controller is further configured to:
   receive a combined request from the host device, wherein the combined request includes a write request and the L2P entry of the second file;
   determine a logic address of the second file based on the write request;
   determine a physical address of the second file based on the logic address and the L2P entry;
   determine a second physical address; and
   write a group of data in the second physical address.

* * * * *